UNITED STATES PATENT OFFICE.

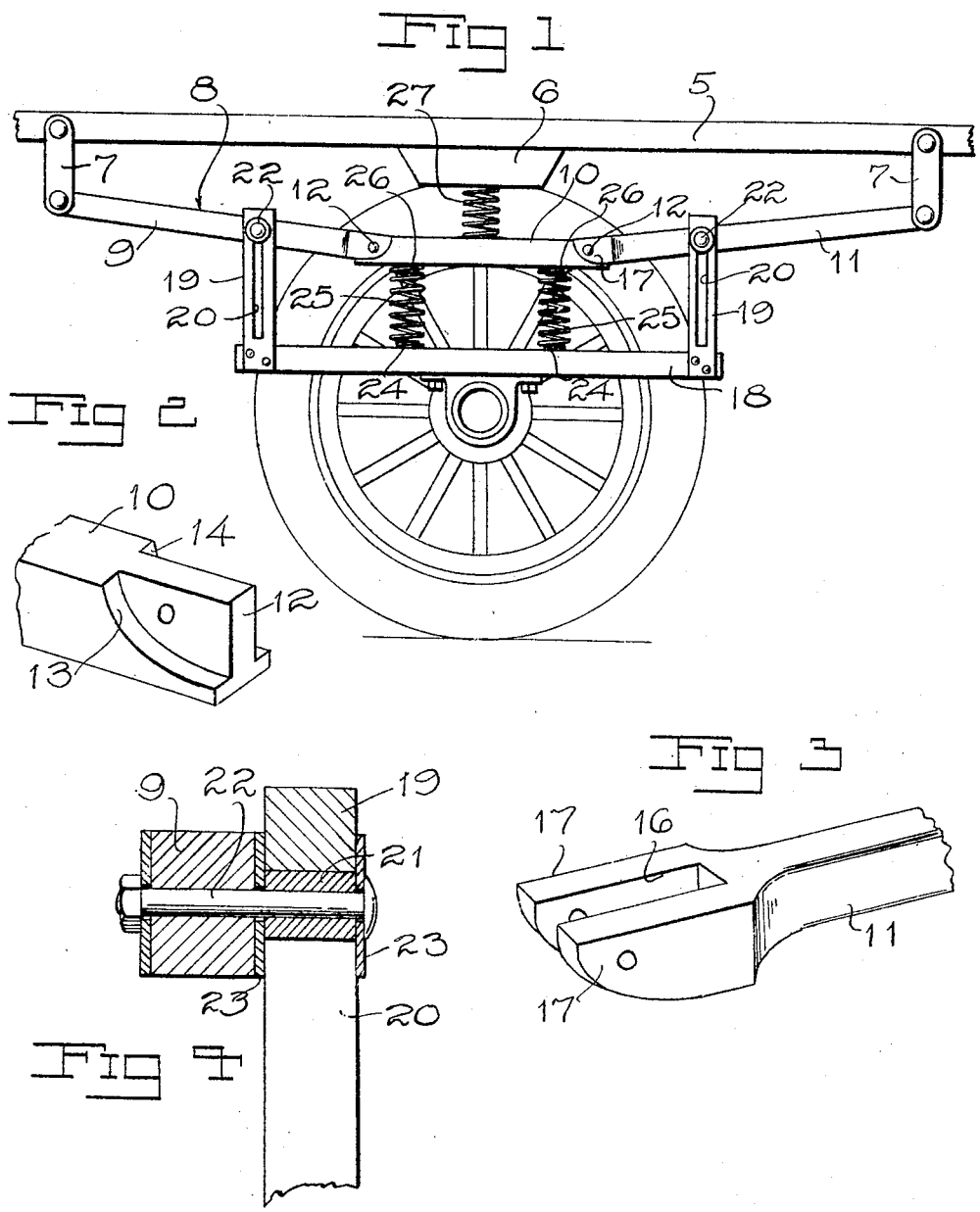

SAMUEL A. SMITH, OF OILTON, OKLAHOMA.

VEHICLE-SPRING.

1,333,999.  Specification of Letters Patent.  Patented Mar. 16, 1920.

Application filed September 8, 1919. Serial No. 322,323.

*To all whom it may concern:*

Be it known that I, SAMUEL A. SMITH, a citizen of the United States, residing at Oilton, in the county of Creek and State of Oklahoma, have invented certain new and useful Improvements in Vehicle-Springs, of which the following is a specification, reference being had to the accompanying drawings.

This invention relates to vehicle springs, and particularly to that type of spring used on motor vehicles.

The disadvantage of springs previously proposed is that in order for them to properly support the vehicle when loaded, it is necessary to eliminate a large portion of flexibility to prevent breaking of the springs. As a result of this, half of the shocks received in the course of travel are transmitted to the vehicle. To overcome this it is necessary to use shock absorbing attachments, in addition to the springs to take the place of the flexibility omitted.

It is, therefore, the object of this invention to provide a vehicle spring which is not only substantial and capable of efficiently supporting the weight of the vehicle, but one that contains all of the flexibility necessary to absorb all shocks without the use of additional shock absorbing attachments.

These objects are attained by mechanism illustrated in the accompanying drawings, in which:

Figure 1 is a side elevation of the spring applied to a vehicle.

Fig. 2 is a perspective view of the connecting end of one of the links.

Fig. 3 is a perspective view of the connecting ends of one of the links adapted to engage the connecting end shown in Fig. 2.

Fig. 4 shows a sectional view of the connection between the axle engaging frame and the links.

Referring to the drawings, 5 indicates the chassis of a vehicle to the lower surface of which a bumper 6 is secured. Pivoted to the chassis 5 is a plurality of links 7 which pivotally connect the flexible member 8 to the chassis. The flexible member 8 comprises a plurality of links 9, 10 and 11. The ends 12 of the link 10 are cut away at their top and side portions, to provide curved shoulders 13 and 14. The links 9 and 11 are pivotally connected at one of their ends to the links 7, while the remaining ends are furcated as at 16, to provide projecting lugs 17, the bottom surfaces of the lugs being curved. The ends 12 of the link 10 are positioned between the lugs 17, and are pivoted thereto, the lower portion of the shoulders 13 and 14 coöperating with the lugs 17 to limit upward movement of the links.

An axle engaging frame 18 is provided and has extending from one of its sides, adjacent its ends, a plurality of arms 19 having elongated slots 20. Pivotally connected to the links 9 and 10 adjacent their furcated ends is a connecting arm 21 which is connected to the link by means of the bolts 22. These connecting arms are slidably mounted in the slots 20 of the arms 19, washers 23 being disposed between the arm and the link and between the head of the bolt and the arm. The slotted arms 19 are intended to limit the upward movement of the flexible member 8.

Extending from the upper surface of the frame adjacent its central portion is a pair of lugs 24 on which springs 25 are disposed. The upper ends of the springs engage similar lugs 26 depending from the link 10. Disposed between the bumper 6 and the upper surface of the link 10 is a spring 27.

By this novel construction of spring, all shocks received in the course of travel by the axle are absorbed by the springs 25 and links 9, 10 and 11, which eliminate all possibility of shocks being transmitted to the vehicle. The extending arms 19 of the frame 18 limit the expanding movement of the springs 25 through the coöperation of the connecting arms 21, while the spring 27 serves as a cushion for the link 10 in the rebounding movement of the spring.

From the foregoing, it will be readily seen that in view of the novel flexible member 8, the spring is very substantial, but at the same time by its pivotal connections and spring means, provides all the flexibility necessary to produce the required spring action and at the same time absorbing all shocks. In addition to this, the simplicity of its parts will permit it to function indefinitely.

What is claimed is:—

1. The combination with a vehicle, of a flexible member pivoted at its ends to the vehicle, spring means disposed between the vehicle and the flexible member, a frame slidable on said flexible member and depending therefrom, and spring means disposed between the flexible member and the frame.

2. The combination with a vehicle and axle, of a flexible member comprising a plurality of pivotally connected links, said flexible member being pivoted at its ends to the vehicle, spring means disposed between the vehicle and flexible member, an axle engaging frame slidably mounted on said flexible member and depending therefrom, and spring means disposed between the flexible member and the axle engaging frame.

3. The combination with a vehicle and axle, of a flexible member pivoted at its ends to the vehicle, spring means disposed between the vehicle and the flexible member, an axle engaging frame, said frame having slotted projecting arms, connecting means carried by the flexible member and slidable in the slots of said arms, and spring means disposed between the flexible member and the frame.

In testimony whereof I hereunto affix my signature.

SAMUEL A. SMITH.